United States Patent
Hashimoto et al.

(10) Patent No.: US 10,707,790 B2
(45) Date of Patent: Jul. 7, 2020

(54) ELECTRIC POWER GENERATION CONTROL DEVICE FOR CAUSING A REDUCTION IN A TORQUE COMMAND, ELECTRIC POWER GENERATION CONTROL METHOD AND PROGRAM

(71) Applicants: MITSUBISHI HEAVY INDUSTRIES, LTD., Tokyo (JP); Mitsubishi Electric Corporation, Tokyo (JP)

(72) Inventors: Masayuki Hashimoto, Tokyo (JP); Tsuyoshi Wakasa, Tokyo (JP); Yoshiyuki Kono, Tokyo (JP); Shuhei Fujiwara, Tokyo (JP)

(73) Assignees: MITSUBISHI HEAVY INDUSTRIES, LTD., Tokyo (JP); MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/547,318

(22) PCT Filed: Dec. 2, 2015

(86) PCT No.: PCT/JP2015/083891
§ 371 (c)(1),
(2) Date: Jul. 28, 2017

(87) PCT Pub. No.: WO2016/125376
PCT Pub. Date: Aug. 11, 2016

(65) Prior Publication Data
US 2018/0026562 A1    Jan. 25, 2018

(30) Foreign Application Priority Data

Feb. 3, 2015   (JP) .................. 2015-019695

(51) Int. Cl.
*H02P 9/04*    (2006.01)
*H02J 3/36*    (2006.01)
(Continued)

(52) U.S. Cl.
CPC ................. *H02P 9/04* (2013.01); *H02J 3/36* (2013.01); *H02J 3/38* (2013.01); *H02J 3/46* (2013.01);
(Continued)

(58) Field of Classification Search
CPC .... F03D 7/00; F03D 9/255; H02J 3/36; H02J 3/38; H02J 3/46; H02P 2101/15; H02P 9/00; H02P 9/04
See application file for complete search history.

(56) References Cited

U.S. PATENT DOCUMENTS 8,305,778 B2    11/2012 Jiang-Häfner
2013/0214537 A1*   8/2013 Hashimoto ............. F03D 15/00
                                                        290/55
(Continued)

FOREIGN PATENT DOCUMENTS

EP    2 360 375    8/2011
EP    2 908 004    8/2015
(Continued)

OTHER PUBLICATIONS

International Search Report dated Feb. 23, 2016 in International Application No. PCT/JP2015/083891, with English-language translation.
(Continued)

*Primary Examiner* — Tulsidas C Patel
*Assistant Examiner* — S. Mikailoff
(74) *Attorney, Agent, or Firm* — Wenderoth, Lind & Ponack, L.L.P.

(57) ABSTRACT

The present electric power generation control device includes: an event detection unit which detects an event
(Continued)

attributable to a deterioration in the balance between a torque input to a generator and an effective power output by the generator, the deterioration being caused by a reduction in a set value of the effective power received from the generator by an electric power converter when the electric power converter has detected a failure necessitating interruption of electric power transmission from the generator by a direct-current (DC) power transmission unit, the DC power transmission unit transmitting DC power, the electric power converter connecting a generator to the DC power transmission unit; and a torque command reduction unit which causes a reduction in a torque command to a motor when the event detection unit has detected the event attributable to the deterioration in the balance, the motor outputting the torque input to the generator.

5 Claims, 11 Drawing Sheets

(51) Int. Cl.

| | | |
|---|---|---|
| *H02P 9/00* | (2006.01) | |
| *H02J 3/38* | (2006.01) | |
| *H02J 3/46* | (2006.01) | |
| *H02P 101/15* | (2016.01) | |
| *F03D 9/25* | (2016.01) | |
| *F03D 7/00* | (2006.01) | |

(52) U.S. Cl.
CPC ............... *H02P 9/00* (2013.01); *F03D 7/00* (2013.01); *F03D 9/255* (2017.02); *H02P 2101/15* (2015.01)

(56) References Cited

U.S. PATENT DOCUMENTS

| | | | | |
|---|---|---|---|---|
| 2013/0257049 | A1* | 10/2013 | Taylor | .................. H02P 9/006 290/43 |
| 2018/0026562 | A1* | 1/2018 | Hashimoto | ............... H02J 3/36 290/40 B |

FOREIGN PATENT DOCUMENTS

| | | | | |
|---|---|---|---|---|
| EP | | 2908004 A1 * | 8/2015 | ............ F03D 7/048 |
| GB | | 2518989 | 4/2015 | |
| JP | | 2014-128159 | 7/2014 | |
| WO | | 2014/021066 | 2/2014 | |
| WO | | 2014/112033 | 7/2014 | |

OTHER PUBLICATIONS

Written Opinion of the International Searching Authority dated Feb. 23, 2016 in International Application No. PCT/JP2015/083891, with English-language translation.

* cited by examiner

ELECTRIC POWER GENERATION CONTROL DEVICE FOR CAUSING A REDUCTION IN A TORQUE COMMAND, ELECTRIC POWER GENERATION CONTROL METHOD AND PROGRAM

TECHNICAL FIELD

The present invention relates to an electric power generation control device, an electric power converter control device, an electric power generation control method and a program.

Priority is claimed on Japanese Patent Application No. 2015-019695, filed Feb. 3, 2015 in Japan, the content of which is incorporated herein by reference.

BACKGROUND ART

Employment of high voltage direct current (HVDC) transmission for transmitting a large amount of electric power over a long distance is progressing. For example, in an offshore wind turbine, AC power transmission is generally performed when an offshore distance is short (equal to or shorter than several km), whereas DC power transmission is used when the offshore distance is long.

In a case in which DC power transmission from electric power generation equipment such as an offshore wind turbine to an electric power system is performed, when an incident such as a short-circuit, grounding or the like is generated at a point of interconnection with the electric power system and thus the voltage of the interconnection point decreases, it may not be possible to transmit electric power to the electric power system. Meanwhile, when no countermeasures are taken in the electric power generation equipment such as a wind turbine, the electric power generation equipment continues electric power generation because the electric power generation equipment cannot detect the incident. As a result, the electric power of a DC power transmission unit becomes excessive and the voltage of the DC power transmission unit increases. Due to such voltage increase, faults such as device breakage may be generated.

To prevent such voltage increase, a method for installing a damping resistor and a semiconductor switch in the DC power transmission unit to dissipate excessive electric power may be conceived. However, to dissipate all excessive electric power, the capacities of the damping resistor and the semiconductor switch also become significantly high resulting in increases in the costs, weights and sizes thereof. This causes an increase in the electric power generation costs of the whole electric power generation system including the DC power transmission unit.

In view of this, Patent Literature 1 discloses a method for decreasing an AC voltage of an offshore converter in order to limit electric power from an offshore wind turbine which flows into an offshore AC/DC converter as a method for decreasing the capacities of a damping resistor and a semiconductor switch for the offshore wind turbine.

CITATION LIST

Patent Literature

[Patent Literature 1]
U.S. Pat. No. 8,305,778

SUMMARY OF INVENTION

Technical Problem

The method described in Patent Literature 1 is based upon a premise that the offshore wind turbine includes the electric power converter and the peak value of the output current thereof is limited by the electric power converter.

Meanwhile, grid connection using a synchronous generator is mainstream in general electric power generation equipment. In addition, a grid connection method using a synchronous generator has been proposed also for wind turbines. Here, the synchronous generator has a high current (short-circuit current) when an output short-circuit is generated compared to an electric power converter. Accordingly, even when an AC voltage is intended to be decreased in an AC/DC converter of a wind turbine, the voltage does not decrease due to a high current flowing in the wind turbine, and thus there is a likelihood that the wind turbine may not be able to detect an incident.

The present invention proposes an electric power generation control device, an electric power converter control device, an electric power generation control method and a program by which electric power generation equipment can detect an incident at an electric power system side, such as a point of interconnection with the electric power system, rather than a DC power transmission unit (more specifically, an incident at the electric power system side rather than an electric power converter which connects the DC power transmission unit to the electric power system) even in a case where a short-circuit current is high in electric power generation equipment such as a wind turbine.

Solution to Problem

According to a first aspect of the present invention, an electric power generation control device includes: an event detection unit which, when an electric power converter, connecting a generator to a direct-current (DC) power transmission unit which transmits DC power, has detected a failure necessitating interruption of electric power transmission from the generator by the DC power transmission unit, detects an event attributable to a deterioration in the balance between a torque input to the generator and an effective power output by the generator, the deterioration being caused by a reduction in a set value of the effective power received from the generator by the electric power converter; and a torque command reduction unit which, when the event detection unit has detected an event attributable to a deterioration in the balance, causes a reduction in a torque command to a motor which outputs the torque input to the generator.

The event detection unit may detect, as an event attributable to a deterioration in the balance, an event indicating at least one of an increase in revolutions per minute (RPM) of the generator and an increase in a frequency of an electric power system connected to the generator.

The event detection unit may detect, as an event attributable to a deterioration in the balance, an increase in a deviation between an effective power from the generator and the torque command to the motor.

A DC bus which carries electric power from the generator as DC power may be installed between the generator and the electric power converter, and the event detection unit may detect a voltage increase in the DC bus as an event attributable to a deterioration in the balance.

According to a second aspect of the present invention, an electric power converter control device is an electric power converter control device controlling an electric power converter which connects a generator to a DC power transmission unit transmitting DC power and, when a failure necessitating interruption of electric power transmission from the generator by the DC power transmission unit has been detected, reduces a set value of an effective power received from the generator by the electric power converter.

According to a third aspect of the present invention, an electric power generation control method includes: when an electric power converter, connecting a generator to a DC power transmission unit which transmits DC power, has detected a failure necessitating interruption of electric power transmission from the generator by the DC power transmission unit, detecting an event attributable to a deterioration in the balance between a torque input to the generator and an effective power output by the generator, the deterioration being caused by a reduction in a set value of the effective power received from the generator by the electric power converter; and, when an event attributable to a deterioration in the balance has been detected, causing a reduction in a torque command to a motor which outputs the torque input to the generator.

According to a fourth aspect of the present invention, a program causes a computer, when an electric power converter, connecting a generator to a DC power transmission unit which transmits DC power, has detected a failure necessitating interruption of electric power transmission from the generator by the DC power transmission unit, to detect an event attributable to a deterioration in the balance between a torque input to the generator and an effective power output by the generator, the deterioration being caused by a reduction in a set value of the effective power received from the generator by the electric power converter, and when an event attributable to a deterioration in the balance has been detected, to cause a reduction in a torque command to a motor which outputs the torque input to the generator.

Advantageous Effects of Invention

According to the aforementioned electric power generation control device, electric power converter control device, electric power generation control method and program, the electric power generation equipment can detect incidents at the electric power system side rather than the electric power converter which connects the DC power transmission unit to the electric power system even in a case where a short-circuit current is high in the electric power generation equipment.

EMBODIMENTS FOR CARRYING OUT THE INVENTION

While embodiments of the present invention will be described hereinafter, the embodiments below do not limit the invention according to the claims. In addition, all combinations of features described in the embodiments are not necessarily essential for means for solving the problem of the invention.

First Embodiment

Figure 1:
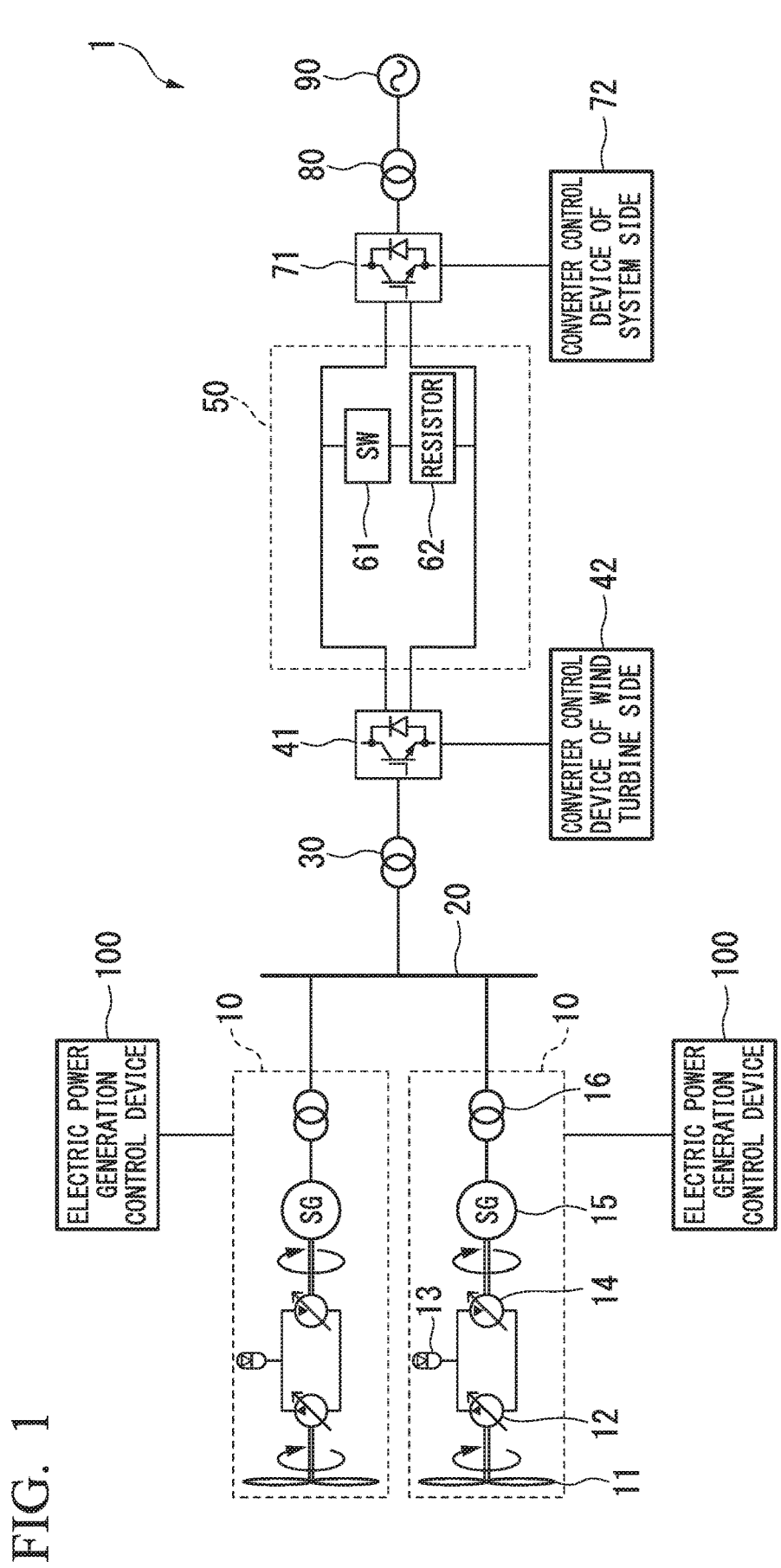
FIG. 1 is a schematic block diagram illustrating a functional configuration of an electric power generation and transmission system in a first embodiment of the present invention.

FIG. 1 is a schematic block diagram illustrating a functional configuration of an electric power generation and transmission system in the first embodiment of the present invention. In FIG. 1, the electric power generation and transmission system 1 includes wind turbines 10, an AC bus 20, a transformer 30, an electric power converter 41 of the wind turbine side, a converter control device 42 of the wind turbine side, a DC power transmission unit 50, a semiconductor switch 61, a damping resistor 62, an electric power converter 71 of a system side, a converter control device 72 of the system side, a transformer 80 and an electric power generation control device 100. The wind turbine 10 includes a blade 11, a hydraulic pump 12, an accumulator 13, a hydraulic motor 14, a synchronous generator 15 and a transformer 16. Hereinafter, the electric power converter 41 of the wind turbine side is referred to as a first converter 41. The converter control device 42 of the wind turbine side is referred to as a first control device 42. The electric power converter 71 of the system side is referred to as a second converter 71. The converter control device 72 of the system side is referred to as a second control device 72.

In the electric power generation and transmission system 1, the transformer 80 is connected to an electric power system 90.

As will be described below, there is a case where the electric power generation and transmission system 1 does not include the semiconductor switch 61 and the damping resistor 62.

The number of wind turbines included in the electric power generation and transmission system 1 is not limited to two and may be one or more.

In addition, the electric power generation equipment in the first embodiment is not limited to a wind turbine. For example, the electric power generation and transmission system 1 may include electric power generation equipment other than a wind turbine, such as then thermal power plant equipment or hydroelectric power generation equipment. Furthermore, the electric power generation and transmission system 1 may include multiple types of electric power generation equipment such as including a wind turbine and thermal power plant equipment.

The wind turbine 10 receives wind power to generate electric power and supplies the generated electric power to the electric power system 90 through the DC power transmission unit 50. For example, the wind turbine 10 may be an offshore wind turbine installed in the ocean. However, the installation place of the wind turbine 10 is not limited to the ocean and may be the ground.

In the wind turbine 10, the hydraulic pump 12 is driven by wind power energy received by the blade 11, the hydraulic motor 14 is driven by the hydraulic pump 12, and the synchronous generator 15 is driven by mechanical energy from the hydraulic motor 14. That is, when the blade 11 is rotated by receiving wind power, the hydraulic pump 12 is driven by rotational energy from the blade 11 to generate hydraulic power. The hydraulic motor 14 is driven by the hydraulic power from the hydraulic pump 12 to drive a rotor of the synchronous generator 15. The synchronous generator 15 generates AC power from the rotational energy. Meanwhile, oil for hydraulic power transmission is accumulated in the accumulator 13. In this manner, a case in which the wind turbine 10 causes the synchronous generator 15 to be driven by hydraulic power is exemplified in the first embodiment.

A combination of the blade 11, the hydraulic pump 12, the accumulator 13 and the hydraulic motor 14 corresponds to an example of a motor, and a torque (mechanical torque) input to the synchronous generator 15 is output to rotate the rotor of the synchronous generator 15.

Here, the motor is a machine that converts energy existing in nature into mechanical energy. Here, the energy existing in nature may be various types of energy. For example, the energy existing in nature may be thermal energy from fuel such as coal or oil, thermal energy such as geothermal heat or solar heat, light energy such as sunlight, or kinetic energy or potential energy such as wind power or water power. In the first embodiment, a case in which the energy existing in nature is wind power is exemplified.

The transformer 16 transforms the electric power generated by the synchronous generator 15 into a voltage of the AC bus 20 and outputs the voltage to the AC bus 20.

The AC bus 20 transmits electric power output from each wind turbine 10 to the transformer 30.

The transformer 30 performs voltage transformation on the electric power from the AC bus 20 and outputs the transformed voltage to the first converter 41.

The first converter 41 connects the generator to the DC power transmission unit that transmits DC power, converts the electric power (AC power) from the transformer 30 into DC power and outputs the DC power to the DC power transmission unit 50.

The first control device 42 controls electric power conversion by the first converter 41. Particularly, a case where the first control device 42 has detected a failure that necessitates interruption of the electric power transmission by the DC power transmission unit 50, such as an incident at a point of interconnection with the electric power system 90, is described. In this case, the first control device 41 decreases a set value of an effective power (effective power command) received by the first converter 41 from the synchronous generator 15. The first control device 42 corresponds to an example of an electric power converter control device.

For example, the first control device 42 detects that the voltage of the DC power transmission unit 50 has increased to equal to or higher than a predetermined threshold value because electric power cannot be output from the DC power transmission unit 50 to the electric power system 90. Then, the first converter 41 reduces the set value of the effective power received from the synchronous generator 15. Meanwhile, the reduction herein includes cutoff. Cutting off the set value of the effective power is to set the set value of the effective power to 0. Accordingly, the first control device 42 may cause the first converter 41 to cut off the effective power received from the synchronous generator 15 or to reduce the effective power to a value greater than 0. Hereinafter, a case where the first control device 42 causes the first converter 41 to cut off the effective power received from the synchronous generator 15 will be exemplified.

Figure 2:
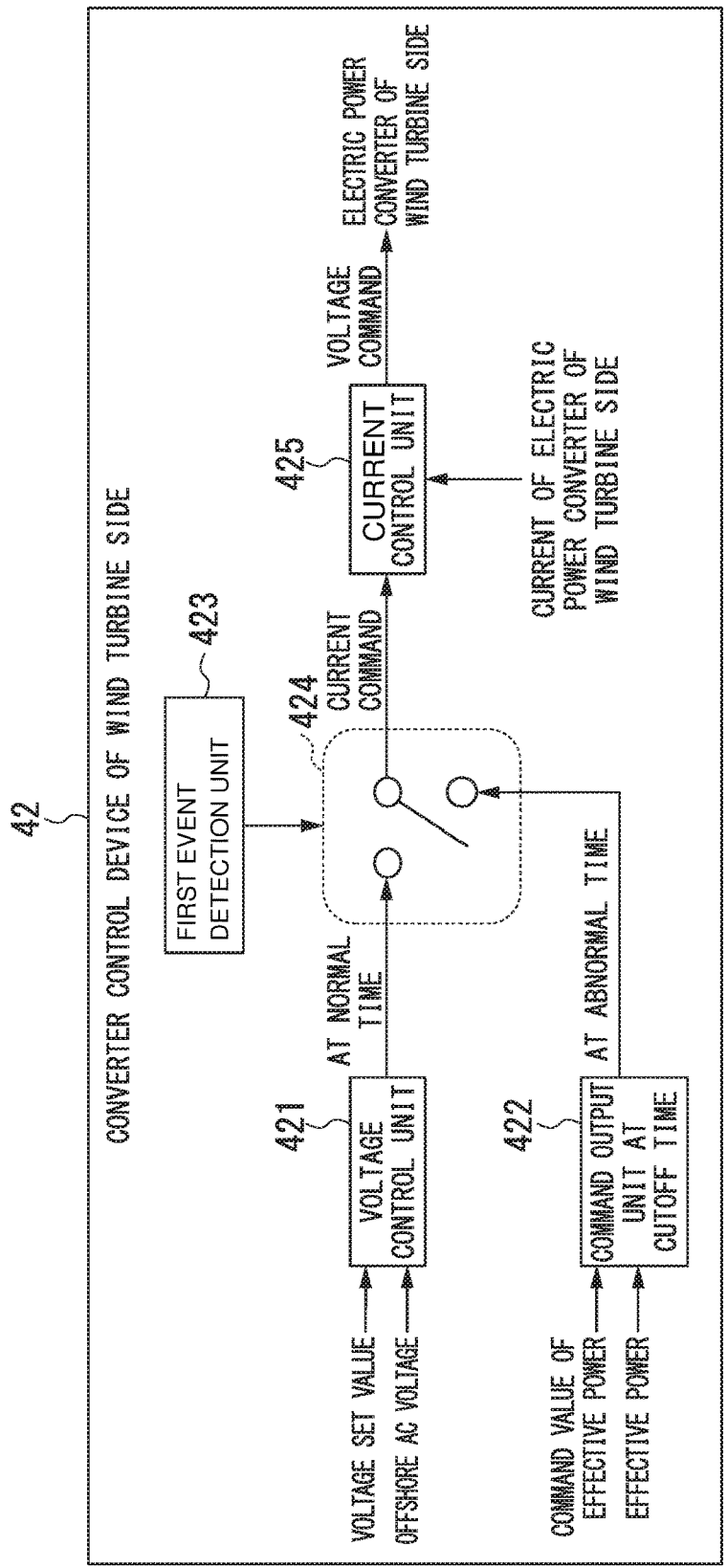
FIG. 2 is a schematic block diagram illustrating a functional configuration of a converter control device of a wind turbine side in the first embodiment of the present invention.

FIG. 2 is a schematic block diagram illustrating a functional configuration of the first control device 42. In FIG. 2, the first control device 42 includes a voltage control unit 421, a command output unit 422 at a cutoff time, a first event detection unit 423, a command-switching unit 424 and a current control unit 425. Hereinafter, the command output unit 422 at a cutoff time is referred to as an output unit 422.

The voltage control unit 421 outputs a current command to the current control unit 425 at a normal time. The current command output by the voltage control unit 421 is generated such that an AC voltage and a frequency in the ocean remain constant. At a normal time, the first converter 41 is controlled on the basis of a voltage command controlled in the current control unit 425 on the basis of the current command. That is, the current control unit 425 generates a voltage command such that a current value of the first converter 41 becomes a current command value of the voltage control unit 421 and outputs the generated voltage command to the first converter 41.

The output unit 422 outputs a command for cutting off or reducing the effective power as a command at an abnormal time. Meanwhile, in a case where the first converter 41 sets the received effective power to 0, the first converter 41 may be interrupted. For example, the abnormal time is a time at which a failure that necessitates interruption of electric power transmission by the DC power transmission unit 50 is generated. The command for cutting off the effective power is a command for setting the effective power received by the first converter 41 to 0, for example.

The first event detection unit 423 detects generation of a failure that necessitates interruption of the electric power transmission by the DC power transmission unit 50, For example, the first event detection unit 423 detects generation of a failure that necessitates interruption of the electric power transmission by the DC power transmission unit 50 by detecting an increase in the voltage of the DC power transmission unit 50 to equal to or higher than a predetermined threshold value.

However, the method of detecting, by the first event detection unit 423, a failure that necessitates interruption of the electric power transmission by the DC power transmission unit 50 is not limited to the method of detecting an increase in the voltage of the DC power transmission unit 50. For example, the first event detection unit 423 may be notified of generation of a failure through communication.

The command-switching unit 424 performs command switching for the first converter 41. Specifically, in a state in which the first event detection unit 423 has not detected an increase in the voltage of the DC power transmission unit 50 to equal to or higher than the predetermined threshold value, the command-switching unit 424 outputs a current command from the voltage control unit 421 to the first converter 41. On the other hand, in a state in which the first event detection unit 423 has detected an increase in the voltage of the DC power transmission unit 50 to equal to or higher than the predetermined threshold value, the command-switching unit 424 outputs a current command from the output unit 422 to the first converter 41.

The DC power transmission unit 50 transmits the output of the first converter 41 to the second converter 71 as DC power.

The damping resistor 62 is an electrical resistor for consuming excessive electric power when an incident has occurred.

The semiconductor switch 61 remains in an open state (off) and thus current does not flow therethrough at a normal time. On the other hand, if excessive power is generated when an incident has occurred, the semiconductor switch 61 switches to a closed state (on) to allow current to flow to the damping resistor 62 so as to consume excessive electric power.

The second converter 71 converts DC output from the DC power transmission unit 50 into AC power and outputs the AC power to the transformer 80.

The second control device 72 controls electric power conversion by the second converter 71.

The transformer 80 transforms the electric power from the second converter 71 into a voltage of the electric power system 90 and outputs the voltage to the electric power system 90.

The electric power system 90 is an electric power system of an electric power company and transmits electric power from each of pieces of electric power generation equipment.

The electric power generation control device 100 controls a torque of the hydraulic motor 14 (a torque output by the hydraulic motor 14 to the synchronous generator 15). Particularly, the electric power generation control device 100 reduces a torque command to the hydraulic motor 14 (a torque command output to the hydraulic motor 14). Accordingly, the electric power generation control device 100 controls the electric power generation by the synchronous generator 15.

Meanwhile, the reduction includes cutoff (setting to 0) herein. Accordingly, the electric power generation control device 100 may instruct the torque from the hydraulic motor 14 to the synchronous generator 15 to be cut off or instruct the torque to be reduced to a value greater than 0. Hereinafter, a case where the electric power generation control device 100 instructs the torque from the hydraulic motor 14 to the synchronous generator 15 to be cut off will be exemplified.

Here, when the torque command to the hydraulic motor 14 is multiplied by revolutions per minute (RPM) of the synchronous generator 15, the torque command becomes equal to an effective power command to the synchronous generator 15. In this way, the effective power command can be interchanged with the torque command.

Figure 3:
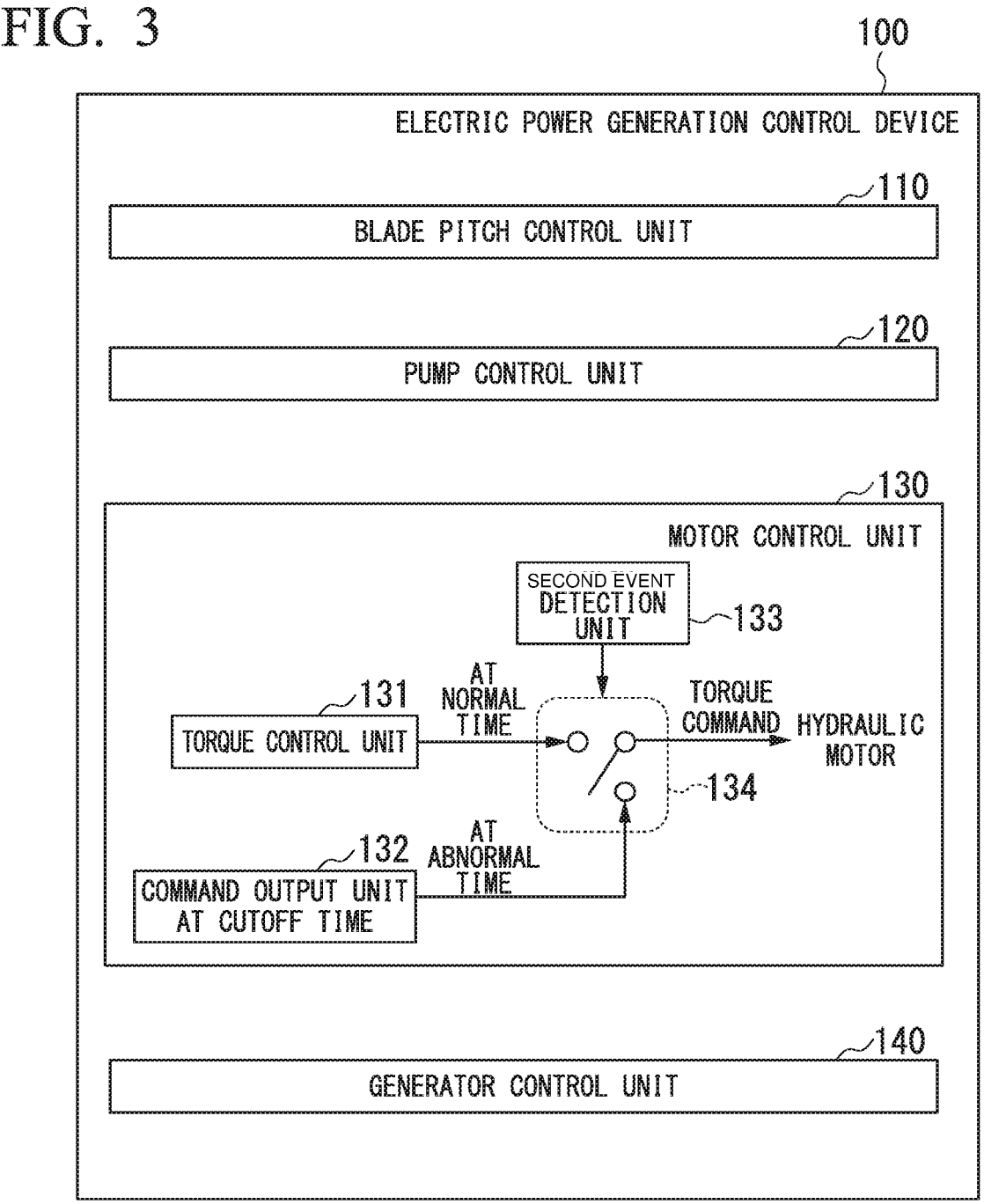
FIG. 3 is a schematic block diagram illustrating a functional configuration of an electric power generation control device in the first embodiment of the present invention.

FIG. 3 is a schematic block diagram illustrating a functional configuration of the electric power generation control device 100. In FIG. 3, the electric power generation control device 100 includes a blade pitch control unit 110, a pump control unit 120, a motor control unit 130 and a generator control unit 140. The motor control unit 130 includes a torque control unit 131, a command output unit 132 at a cutoff time, a second event detection unit 133 and a command-switching unit 134. Hereinafter, the command output unit 132 at a cutoff time is referred to as an Output unit 132.

The blade pitch control unit 110 controls the pitch of the blade 11 (the angle of the blade 11).

The pump control unit 120 controls the hydraulic pump 12.

The motor control unit 130 controls the hydraulic motor 14.

The torque control unit 131 generates a torque command to the hydraulic motor 14 at a normal time. At a normal time, the hydraulic motor 14 operates to output a torque corresponding to a command value (torque command) output by the torque control unit 131 to the synchronous generator 15.

The output unit 132 outputs a torque command value of 0 as a torque command to the hydraulic motor 14 at an abnormal time. At an abnormal time, the hydraulic motor 14 cuts off output of the torque from the hydraulic motor 14 to the synchronous generator 15 on the basis of the command value of 0 output by the output unit 132.

The second event detection unit 133 detects an event attributable to a deterioration in the balance between a torque input to the synchronous generator 15 and an effective power output by the synchronous generator 15, which is caused by a reduction in a set value of the effective power received from the synchronous generator 15 by the first converter 41. Specifically, the torque input to the synchronous generator 15 becomes excessive for the effective power output by the synchronous generator 15 due to a reduction in the set value of the effective power received from the synchronous generator 15 by the first converter 41. Accordingly, the RPM of the synchronous generator 15 and the frequency of the electric power system connected to the synchronous generator 15 increase, and the second event detection unit 133 detects an increase in the RPM to equal to or higher than a predetermined threshold value.

Alternatively, the second event detection unit 133 may detect an vase in the frequency of the electric power system connected to the synchronous generator 15 to equal to higher than a predetermined threshold value.

The command-switching unit 134 performs command switching for the hydraulic motor 14. Specifically, in a state in which the second event detection unit 133 has not detected an increase in the frequency of the electric power system connected to the synchronous generator 15 to equal to or higher than the predetermined threshold value, the command-switching unit 134 outputs a command from the torque control unit 131 to the hydraulic motor 14. On the other hand, in a state in which the second event detection unit 133 has detected an increase in the frequency of the electric power system connected to the synchronous generator 15 to equal to or higher than the predetermined threshold value, the command-switching unit 134 outputs a command from the output unit 132 to the hydraulic motor 14. The command-switching unit 134 corresponds to an example of a torque command reduction unit.

In this manner, the motor control unit 130 reduces an input torque command to the hydraulic motor 14 when the second event detection unit 133 has detected an increase in the frequency of the electric power system connected to the synchronous generator 15 to equal to or higher than the predetermined threshold value because the RPM of the synchronous generator 15 is prevented from increasing due to an excessive torque through control of a mechanical torque from the hydraulic motor 14.

The generator control unit 140 controls the synchronous generator 15.

Next, operation of the electric power generation and transmission system 1 will be described with reference to FIG. 4.

Figure 4:
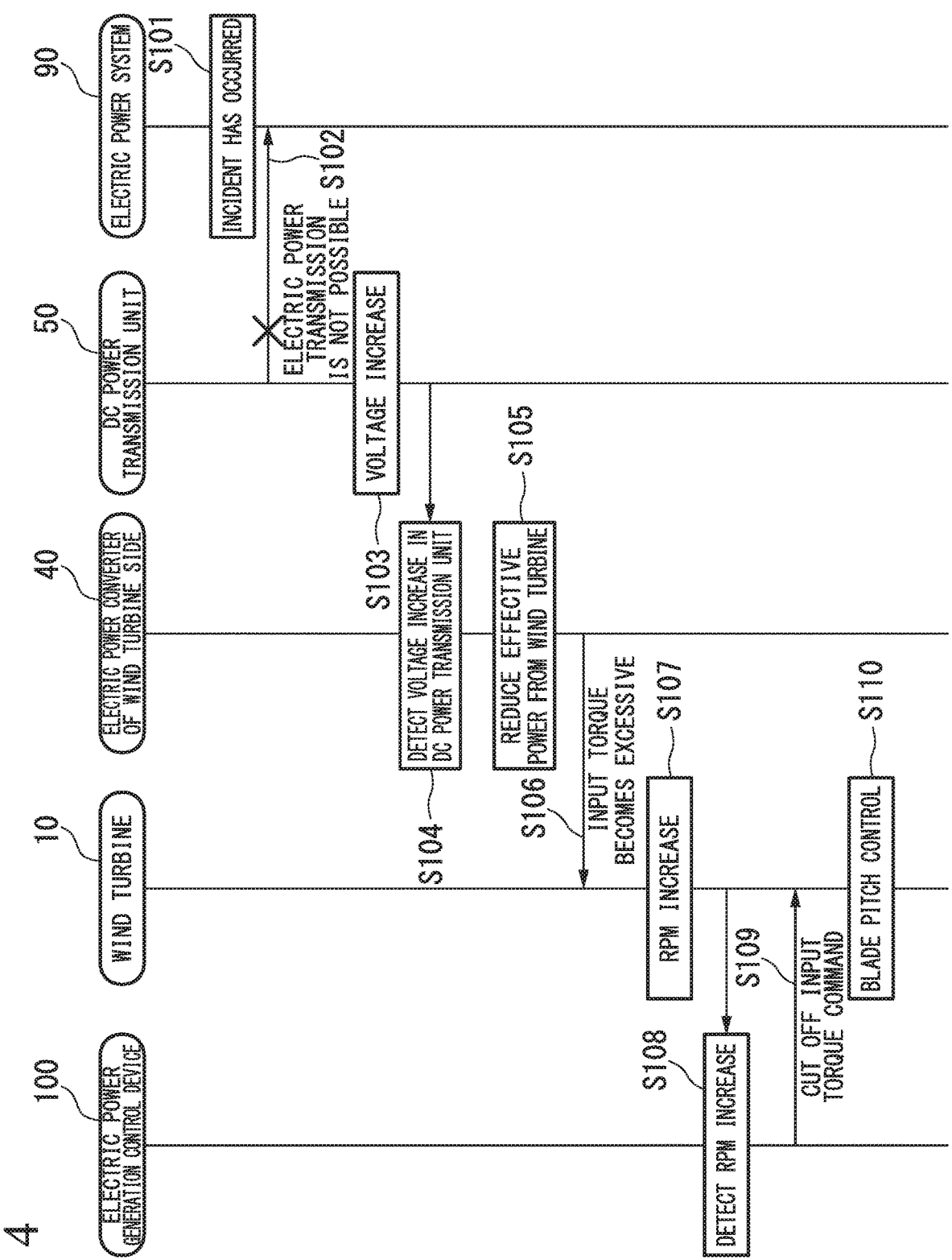
FIG. 4 is a diagram illustrating an example of a process performed by the electric power generation and transmission system when an incident has occurred in the first embodiment of the present invention.

FIG. 4 is a diagram illustrating an example of a process performed by the electric power generation and transmission system 1 when an incident has occurred.

At a normal time, the first converter 41 controls the AC voltage and the frequency between the wind turbine 10 and the first converter 41 such that they remain constant.

Meanwhile, for example, when a system incident has occurred at a point of interconnection with the electric power system, or the like (step S101) and thus electric power transmission to the electric power system becomes impossible (step S102), the electric power of the DC power transmission unit 50 becomes excessive and thus the voltage of the DC power transmission unit 50 increases (step S103).

When an increase in the voltage of the DC power transmission unit 50 to equal to or higher than a predetermined threshold value is detected by the first converter 41 (step S104), the first converter 41 reduces a set value of the effective power received from the wind turbine 10 (step S105). Accordingly, a torque input to the synchronous generator 15 becomes excessive for the effective power output by the synchronous generator 15 (step S106) and thus the RPM of the synchronous generator 15 increases (step S107). An electric power generation frequency (offshore system frequency) increases due to the increase in the RPM of the synchronous generator 15. Herein, the offshore system is an electric power system ranging from the wind turbine 10 to the first converter 41.

The second event detection unit 133 in the electric power generation control device 100 continuously monitors the generator RPM (or the offshore system frequency) to detect that the generator RPM (or the offshore system frequency) has exceeded a predetermined threshold value (e.g., 110% of a rated RPM) (step S108). Then, the command-switching unit 134 cuts off a torque command input to the hydraulic motor 14 (step S109).

The excessive torque is accumulated in the rotor RPM of the wind turbine 10 (RPM of the blade 11 and the shaft). That is, the rotor RPM increases.

Here, blade pitch control is performed such that the rotor RPM remains constant in the wind turbine 10 as in a normal wind turbine (step S110). It is possible to prevent interruption (trip) due to excessive rotation of the wind turbine 10 by reducing input energy through such blade pitch control.

As described above, in a case where the first converter 41 that connects the synchronous generator 15 to the DC power transmission unit 50 has detected a failure necessitating interruption of the electric power transmission from the synchronous generator 15 by the DC power transmission unit 50, the first converter 41 reduces a set value of the effective power received from the synchronous generator 15. In addition, the second event detection unit 133 detects an event attributable to a deterioration in the balance between a torque input to the synchronous generator 15 and the effective power output by the synchronous generator 15, which is caused by the reduction in the set value.

Further, in a case where the second event detection unit 133 has detected an event attributable to a deterioration in the balance, the command-switching unit 134 cuts off a torque command input to the hydraulic motor 14.

In this manner, the second event detection unit 133 detects an event attributable to a deterioration in the balance and thus can detect an incident on the electric power system 90 sine, such as a point of interconnection with the electric power system 90, rather than the second converter 71 even in a case where a short-circuit current of the synchronous generator 15 is high.

In addition, the second event detection unit 133 detects an event indicating at least one of an increase in the RPM of the synchronous generator 15 and the offshore system frequency (the frequency of a system connected to the synchronous generator 15) as an event attributable to a deterioration in the balance.

Accordingly, the second event detection unit 133 can detect an incident at the electric power system 90 side rather than the second converter 71 through a simple process of monitoring the RPM of the synchronous generator 15 or the offshore system frequency such as the electric power generation frequency of the synchronous generator 15.

Furthermore, since the first converter 41 reduces the effective power flowing into the DC power transmission unit 50 on the basis of an increase in the voltage of the DC power transmission unit 50, capacities of both the semiconductor switch 61 and the damping resistor 62 installed in the DC power transmission unit 50 can be reduced or installation thereof becomes unnecessary. Whether the installation of the semiconductor switch 61 and the damping resistor 62 is necessary depends on how far the increase in the RPM of the wind turbine 10 (RPM of the synchronous generator 15, shaft or the like) is permitted.

In addition, even though the wind turbine 10 and the first converter 41 are separately installed, if a power cable between the wind turbine 10 and the first converter 41 is normally connected and a frequency detector included in the second event detection unit 133 is normal, it is possible to detect an abnormality by using a frequency for abnormality transmission. Although a method for abnormality transmission through communication may be conceived, a risk of abnormality transmission not being possible due to a communication cable failure, communication error caused by noise and the like may be conceived. In view of this, detection of an event attributable to a deterioration in the balance by the second event detection unit 133 has higher reliability than abnormality transmission through communication.

Second Embodiment

The method of detecting an abnormality by the event detection unit is not limited to the method using a frequency. In the second embodiment, a case in which the event detection unit detects an abnormality on the basis of a deviation between a command value and a measurement value of an effective power will be described.

The device configurations in the second embodiment are the same as in FIGS. 1 to 3 and thus illustration and description thereof are omitted. In the second embodiment, a process of the event detection unit 133 (FIG. 3) to detect an abnormality differs from the case of the first embodiment.

The event detection unit 133 detects an abnormality (a failure necessitating interruption of the electric power transmission by the DC power transmission unit 50) on the basis of a deviation between an effective power command to the synchronous generator 15 and a measurement value of the effective power.

Here, a relationship between the frequency of the generator and the effective power is represented by Equation (1).

[Math. 1]

$$M \frac{d\omega}{dt} = P_W - P_G \quad (1)$$

Here, "M" indicates an inertia constant, "PW" indicates a mechanical input (in watts) to the generator and "PG" indicates the effective power (in watts) of the generator.

In addition, "$\omega$" indicates the rotation angular velocity (in rad/s) of the generator and is represented by Math. (2).

[Math. 2]

$$\omega = 2\pi f \quad (2)$$

Here, "f" indicates the RPM (in Hz) of the generator. In addition, the inertia constant "M" is represented by Math. (3).

[Math. 3]

$$M = J\omega_s \quad (3)$$

Here, "J" indicates moment of inertia (in kg~m²) and "$\omega_s$" indicates a synchronous speed (in rad/s) of the generator.

Referring to Equation (1), the derivative of the rotation angular velocity co of the generator is compared with a difference obtained by subtracting the effective power of the generator from the mechanical input to the generator. Therefore, when the rotation angular velocity of the generator gradually increases, the difference obtained by subtracting the effective power of the generator from the mechanical input to the generator rapidly changes when an incident has occurred.

Furthermore, in the wind turbine, an effective power command $P_{WO}^{(ref)}$ (or torque command) to be output by the wind turbine is continuously calculated on the basis of a wind speed and the rotor RPM. In addition, the effective power PG of the generator is measured.

The event detection unit 133 detects an abnormality (a failure necessitating interruption of the electric power transmission by the DC power transmission unit 50) on the basis of the effective power. Specifically, a threshold value $\varepsilon_p$ of an effective power deviation (a difference between an effective power command value to be output by the wind turbine 10 and actual effective power) is preset and the presence or absence of an abnormality is determined on the basis of Math. (4).

[Math. 4]

$$|P_{WO}^{(ref)} - P_G| > \varepsilon_p \quad (4)$$

That is, in a case where the event detection unit 133 has detected that the deviation between the effective power command $P_{WO}^{(ref)}$ and a generator effective power measurement value $P_G$ has exceeded $\varepsilon_p$, the command-switching unit 134 cuts off the effective power by switching commands. Meanwhile, a filter process may be added in order to prevent a malfunction of the determination.

As described above, the event detection unit 133 detects an increase in the deviation between the effective power from the synchronous generator 15 and the effective power command to the synchronous generator 15 as an event attributable to a deterioration in the balance.

Accordingly, the event detection unit 133 can detect an abnormality more rapidly than in a case based on a frequency.

Meanwhile, the second embodiment and the first embodiment may be used together. For example, the event detection unit may perform both abnormality detection based on a frequency and abnormality detection based on an effective power.

Third Embodiment

In the third embodiment, a process when an incident has been eliminated in the configuration of the first embodiment (FIG. 1) will be described. Further, the same may apply to a process when an incident has been eliminated in the configuration of the second embodiment.

A device configuration in the third embodiment is the same as in FIG. 1, and thus illustration and description thereof are omitted.

Figure 5:
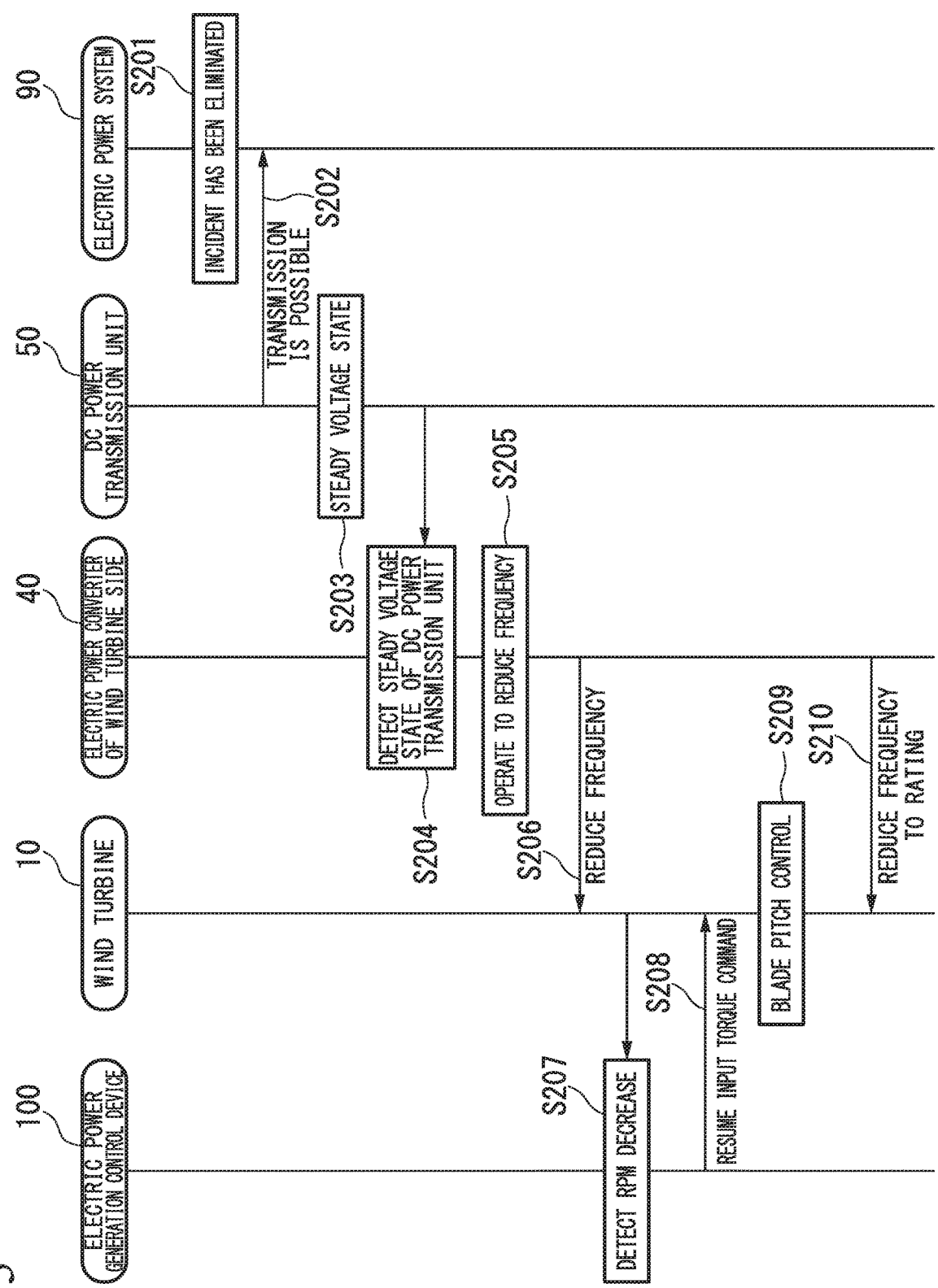
FIG. 5 is a diagram illustrating an example of a process performed by the electric power generation and transmission system when an incident has been eliminated in a third embodiment of the present invention.

FIG. 5 is a diagram illustrating an example of a process performed by the electric power generation and transmission system 1 when an incident has been eliminated.

In a case where a system incident generated at a point of interconnection with the electric power system 90 has been eliminated (step S201) and electric power transmission has been recovered (step S202), the voltage of the DC power transmission unit 50 recovers to a steady state (step S203).

While the system incident continues, a torque input to the synchronous generator 15 becomes excessive for the effective power output by the synchronous generator 15 and thus the RPM of the synchronous generator 15 increases. With respect to this, the first converter 41 operates to rapidly reduce the frequency within the tolerance ranges of the capacity of the first converter 41 and the output variation of the synchronous generator 15 (step S206) immediately after recovery of the voltage of the DC power transmission unit 50 to the steady state is detected (step S204). Specifically, the effective power output by the synchronous generator 15 is increased by increasing the effective power received from the synchronous generator 15 so as to reduce the RPM of the synchronous generator 15 and the offshore system frequency.

When the event detection unit 133 monitors the offshore frequency to detect that the offshore frequency has become lower than a set value (system incident elimination determination frequency) (step S207), the command-switching unit 134 terminates the cutoff of the torque command input to the hydraulic motor 14 and the torque control unit 131 resumes output of the torque command input to the hydraulic motor 14 (step S208).

Although the rotor RPM (RPM of the blade 11 and the shaft) and the RPM of the hydraulic pump 12 decrease according to resumption of torque output by the hydraulic motor 14, blade pitch control is performed such that the rotor RPM and the RPM of the hydraulic pump 12 remain constant as usual (step S209).

The first converter 41 slowly decreases the frequency to a rating when the effective power has been stabilized (step S210).

Figure 6:
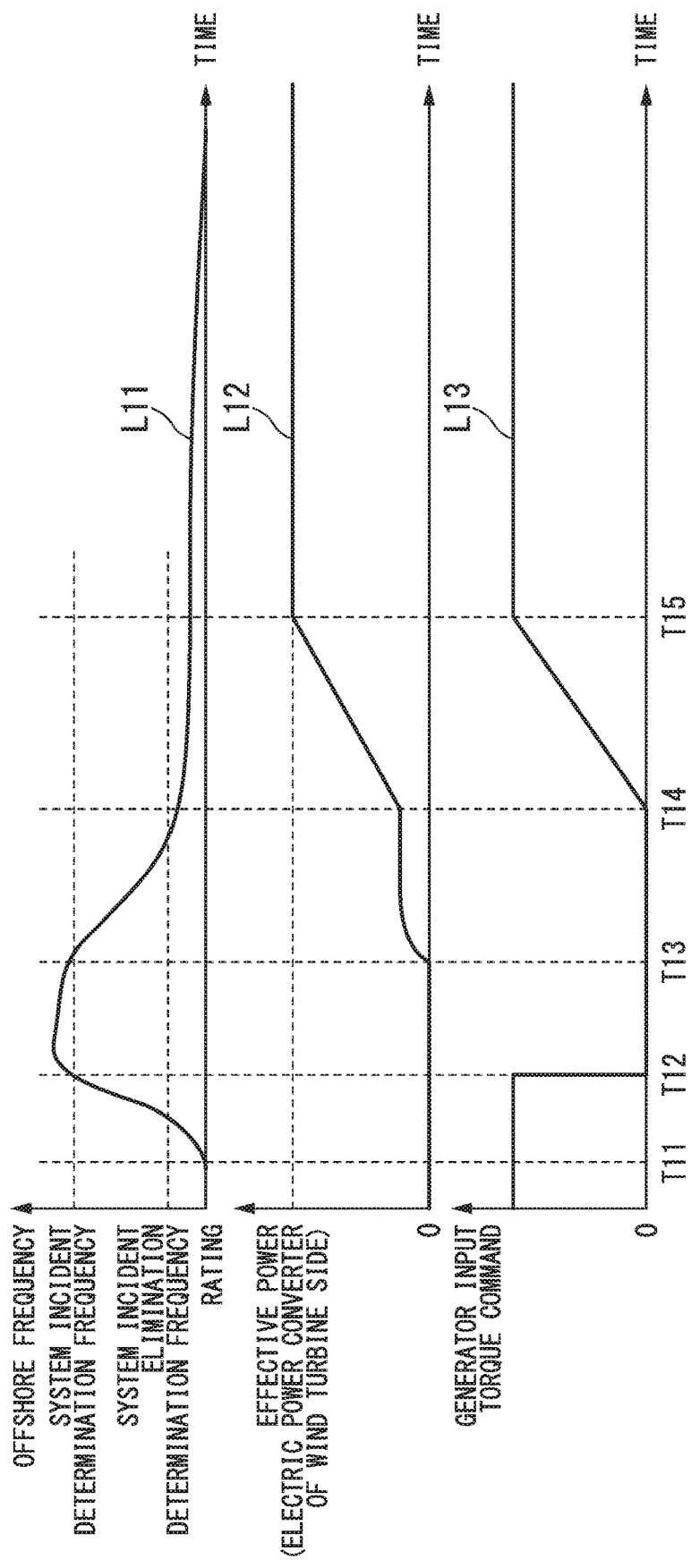
FIG. 6 is a graph showing an example of variations in an offshore frequency, an effective power and an electric power generator input command when an incident has been eliminated in the third embodiment of the present invention.

FIG. 6 is a graph showing an example of variations in the offshore frequency, the effective power and the torque command input to the hydraulic motor 14 when an incident has been eliminated.

The horizontal axis of FIG. 6 represents time. In addition, a line L11 represents the offshore frequency, a line L12 represents the effective power in the first converter 41, and a line L13 represents the torque command input to the hydraulic motor 14.

When a system incident has occurred and an increase in the voltage of the DC power transmission unit 50 to equal to or higher than a predetermined threshold value has been detected at time T11, the first converter 41 cuts off or reduces output of the effective power to the DC power transmission unit 50 (line L12). Accordingly, the offshore frequency increases (line L11).

When the offshore frequency has exceeded a threshold value (system incident determination frequency) at time T12, the command-switching unit 134 cuts off a torque from the hydraulic motor 14 to the synchronous generator 15 (line L11).

In addition, when the system incident has been eliminated at time T13, the first converter 41 outputs the effective power to the DC power transmission unit 50 (line L12) to reduce the offshore voltage (line L13).

When the offshore frequency has been lowered below a threshold value (system incident elimination determination frequency) at time T14, the command-switching unit 134 terminates the cutoff of the torque from the hydraulic motor 14 to the synchronous generator 15 and the torque control unit 131 outputs the torque command input to the hydraulic motor 14 to the wind turbine 10 (line L13).

After resumption of output from the wind turbine 10 is completed at time T15 (line L13), the first converter 41 slowly decreases the offshore frequency to its rating (line L11).

According to the above-described process, the electric power generation and transmission system 1 can resume output while stabilizing the system frequency when a system incident generated at an interconnection point has been eliminated and thus output can be resumed.

Fourth Embodiment

A notification of elimination of an incident is not limited to the aforementioned notification using the offshore frequency. In the fourth embodiment, an example of notifying of elimination of an incident through communication will be described. The fourth embodiment may also be applied to any of the first embodiment and the second embodiment.

Figure 7:
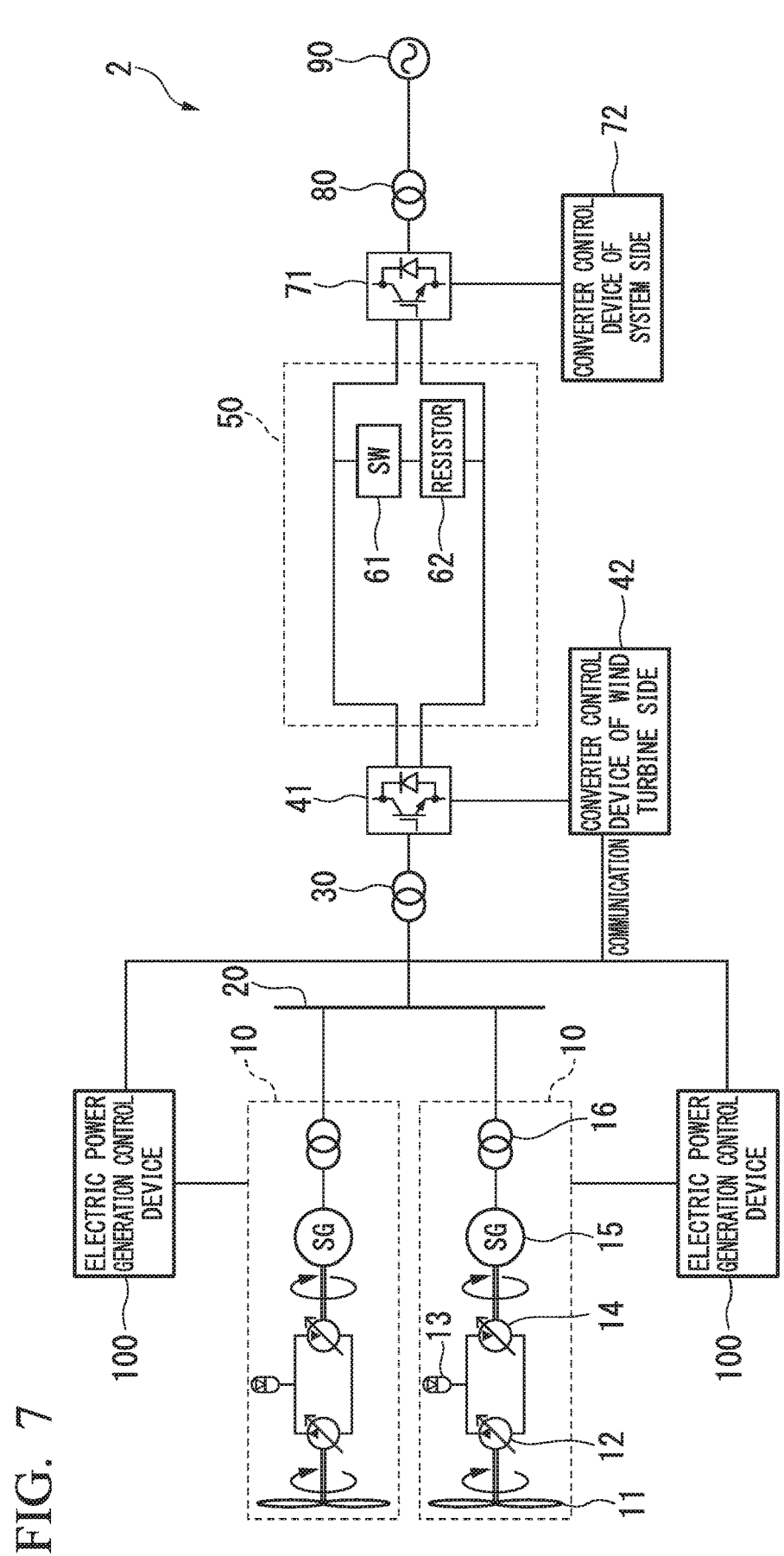
FIG. 7 is a schematic block diagram illustrating a functional configuration of an electric power generation and transmission system in a fourth embodiment of the present invention.

FIG. 7 is a schematic block diagram illustrating a functional configuration of an electric power generation and transmission system in the fourth embodiment of the present invention.

In FIG. 7, parts having the same functions as corresponding parts of FIG. 1 are denoted by the same reference numerals 10 to 16, 20, 30, 41, 42, 50, 61, 62, 71, 72, 80, 90 and 100 and description thereof is omitted.

In the electric power generation and transmission system 2 illustrated in FIG. 7, the first control device 42 communicates with the electric power generation control device 100 in addition to having the configuration of FIG. 1.

Figure 8:
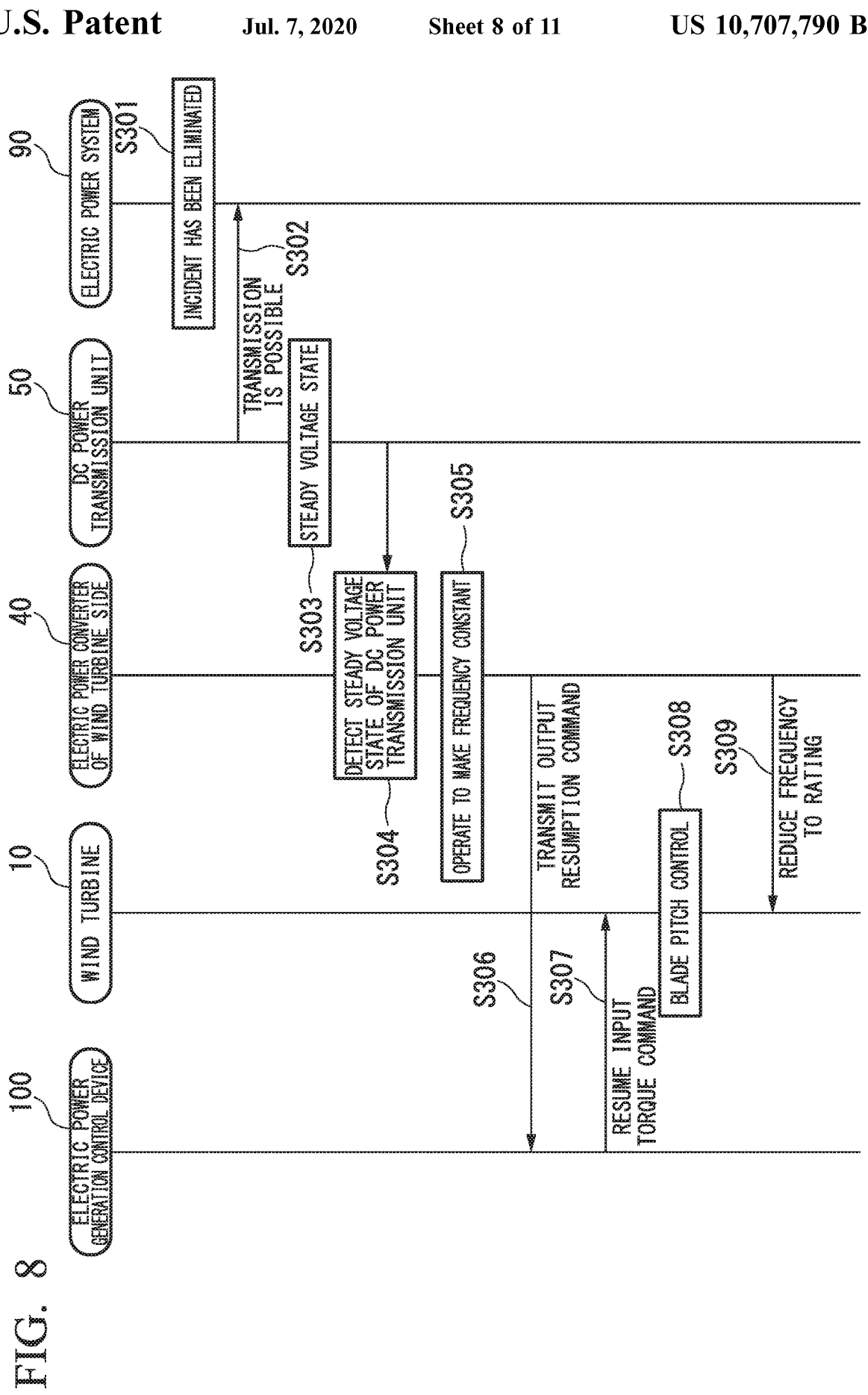
FIG. 8 is a diagram illustrating an example of a process performed by the electric power generation and transmission system when an incident has been eliminated in the fourth embodiment of the present invention.

FIG. 8 is a diagram illustrating an example of a process performed by the electric power generation and transmission system 2 when an incident has been eliminated.

Steps S301 to S304 of FIG. 8 are the same as steps S201 to S204 of FIG. 5.

After step S304, the first converter 41 operates such that the frequency of the offshore system remains constant at this time (step S305). In addition, a controller 300 transmits an output resumption command to the electric power generation control device 100 via communication (step S306). The electric power generation control device 100 resumes output of a torque command input to the hydraulic motor 14 which has been cut off on the basis of this command (step S307).

While the rotor RPM decreases according to resumption of electric power output by the synchronous generator 15, blade pitch control is performed such that the rotor RPM remains constant as usual (step S308).

After the wind turbine 10 resumes output, the first converter 41 decreases the offshore frequency to a rating depending on a remaining capacity of the first converter 41 (step S309).

Figure 9:
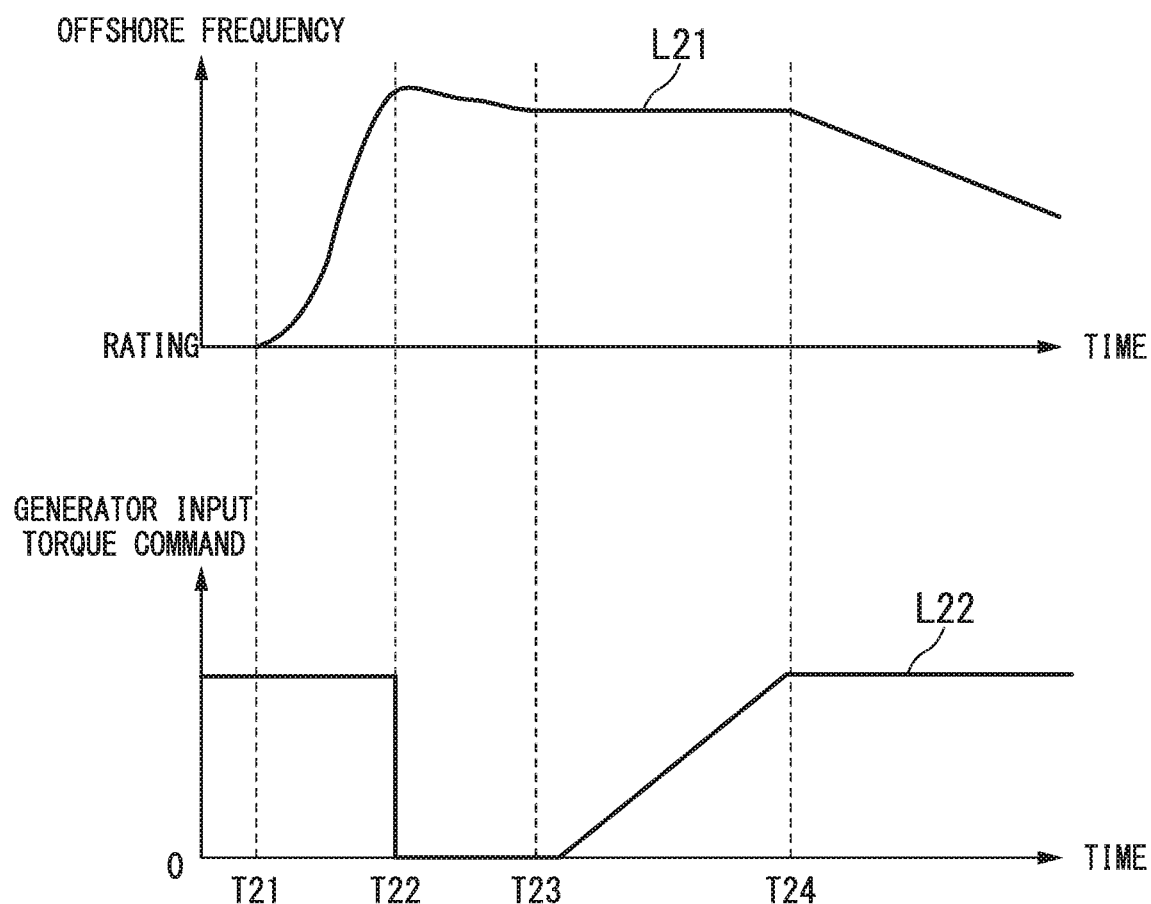
FIG. 9 is a graph showing an example of variations in an offshore frequency and an electric power generator input command in a case where an incident has been eliminated and elimination of the incident is notified through communication in the fourth embodiment of the present invention.

FIG. 9 is a graph showing an example of variations in the offshore frequency and the torque command input to the hydraulic motor 14 in a case where an incident has been eliminated and elimination of the incident is notified through communication.

The horizontal axis of FIG. 9 represents time. In addition, a line L21 represents the offshore frequency and a line L22 represents an input torque command for the hydraulic motor 14.

When a system incident has occurred at time T21, the first converter 41 cuts off output of the effective power to the DC power transmission unit 50 and thus the offshore frequency increases (line L21).

When the offshore frequency has exceeded a threshold value (system incident determination frequency) at time T22, the command-switching unit 134 cuts off the torque command input to the hydraulic motor 14 (line L22).

In addition, when the system incident has been eliminated at time T23, the first converter 41 operates such that the offshore frequency remains constant (line L21). Further, the controller 300 transmits an output resumption command to the electric power generation control device 100 and the electric power generation control device 100 resumes output of the torque command input to the synchronous generator 15 (line L22).

After resumption of output from the wind turbine 10 is completed at time T24 (line L22), the first converter 41 slowly decreases the offshore frequency to the rating (line L21).

According to the above-described process, when a system incident generated at an interconnection point has been eliminated and thus output can be resumed, it is possible to resume output while stabilizing the system frequency.

Fifth Embodiment

Control in the first embodiment is applicable to a wind turbine connected using an electric power converter. This will be described in the fifth embodiment.

Figure 10:
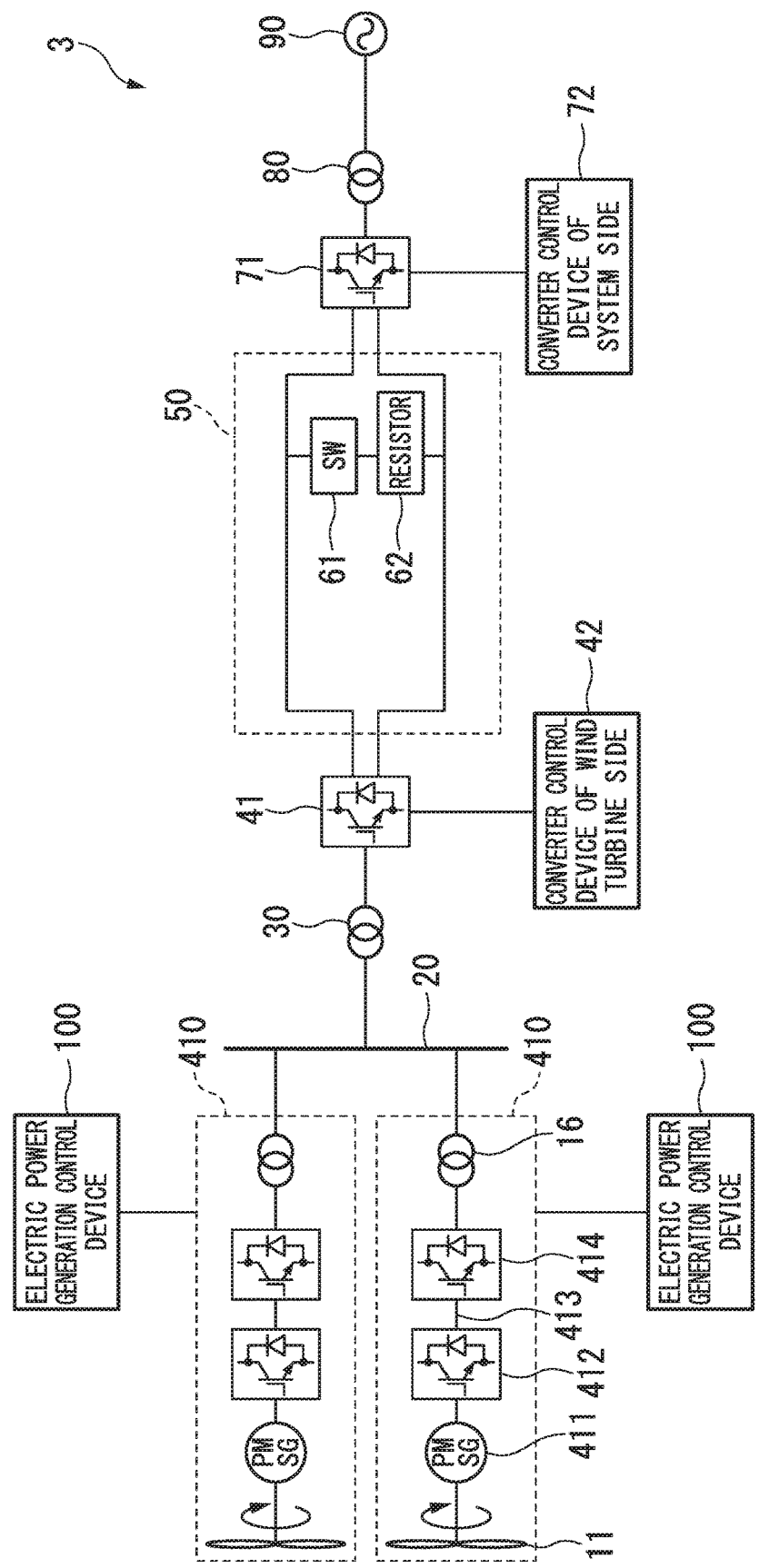
FIG. 10 is a schematic block diagram illustrating a functional configuration of an electric power generation and transmission system in a fifth embodiment of the present invention.

FIG. 10 is a schematic block diagram illustrating a functional configuration of an electric power generation and transmission system in the fifth embodiment of the present invention.

In FIG. 10, parts having the same functions as corresponding parts of FIG. 1 are denoted by the same reference numerals 11, 16, 20, 30, 41, 42, 50, 61, 62, 71, 72, 80 and 90 and description thereof is omitted.

The electric power generation and transmission system 3 illustrated in FIG. 10 differs from the electric power generation and transmission system 1 (FIG. 1) in terms of the configuration of the wind turbine 410 and the process performed by the electric power generation control device 100.

A wind turbine 410 includes a permanent magnet synchronous generator 411 as a generator and additionally includes an AC/DC converter 412, a DC bus 413 and a DC/AC converter 414. However, the generator included in the wind turbine 410 is not limited to a permanent magnet synchronous generator. For example, the wind turbine 410 may include an induction generator instead of the permanent magnet synchronous generator.

Electric power generated by the permanent magnet synchronous generator 411 is converted into DC power in the AC/DC converter 412, passes through the DC bus 413 and then is converted into AC power in the DC/AC converter 414. In this manner, the DC bus 413 carries the electric power from the permanent magnet synchronous generator 411 to the DC/AC converter 414 as DC power.

The electric power generation control device 100 detects a voltage increase in the DC bus 413 as an event attributable to a deterioration in the balance.

Figure 11:
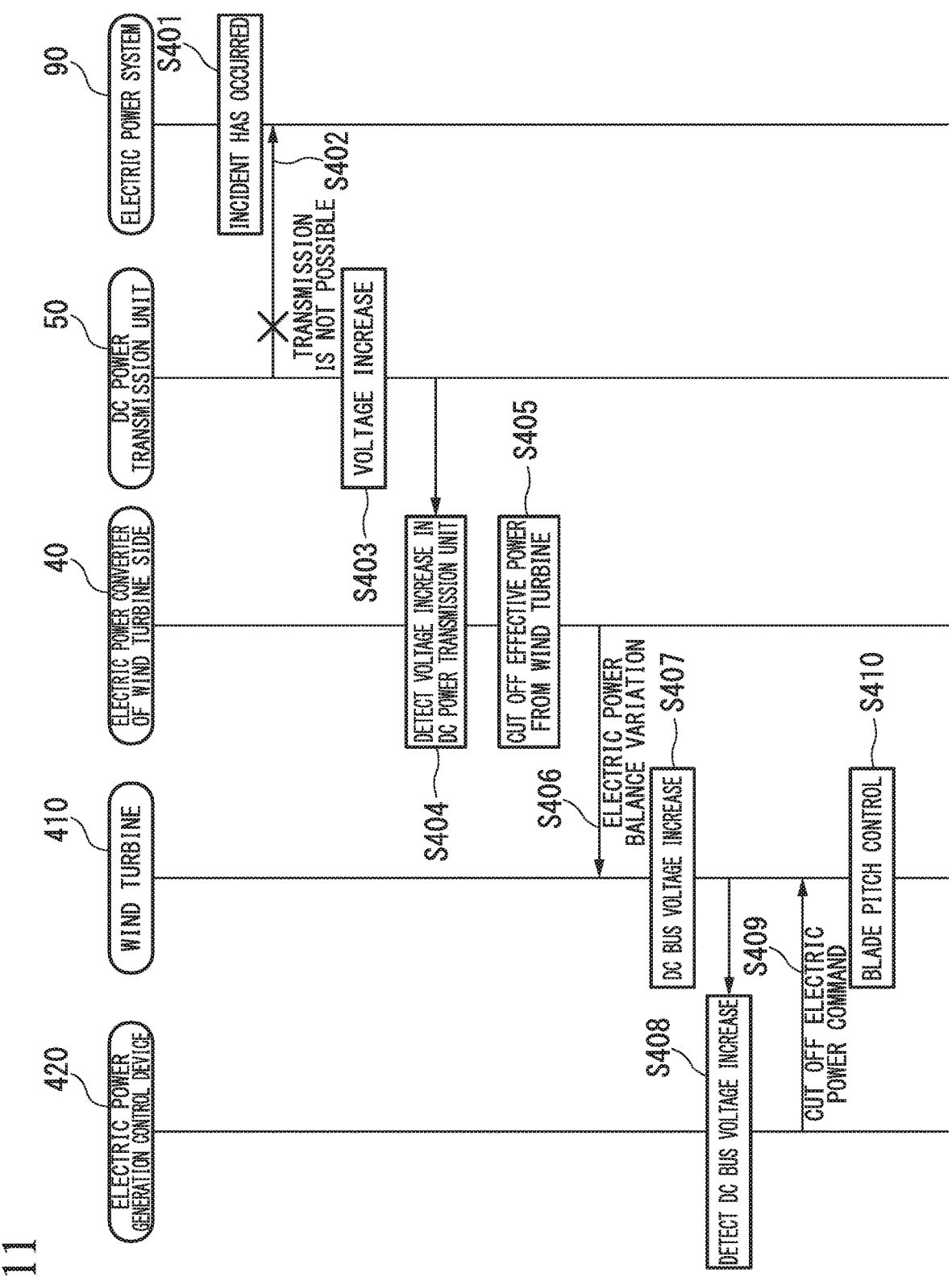
FIG. 11 is a diagram illustrating an example of a process performed by the electric power generation and transmission system when an incident has occurred in the fifth embodiment of the present invention.

FIG. 11 is a diagram illustrating an example of a process performed by the electric power generation and transmission system 3 when an incident has occurred.

Steps S401 to S406 of FIG. 11 are the same as steps S101 to S106 of FIG. 1. A DC bus voltage (the voltage of the DC bus 413) increases due to a deterioration in the balance in step S406 (step S407).

The electric power generation control device 100 continuously monitors the DC bus voltage and, in a case where the DC bus voltage has exceeded a preset threshold value (e.g., 105% of rating) (step S408), cuts off a power command to an AC/DC converter of the wind turbine side among electric power converters of the wind turbine (step S409).

Step S410 is the same as step S110 of FIG. 1.

Accordingly, a wind turbine connected using an electric power converter can also cope with an incident without changing the voltage.

Meanwhile, a program for realizing all or some functions of the electric power generation control device 100 may be recorded on a computer-readable recording medium, and a computer system may be caused to read and execute the program recorded on the recording medium to perform the process of each component. Further, the "computer system" mentioned herein includes hardware such as an OS and a peripheral device.

In addition, the "computer system" also includes a home page providing environment (or a display environment) in a case where a WWW system is used.

Furthermore, the "computer-readable recording medium" refers to storage devices such as portable media, such as a flexible disk, a magneto-optical disc, a ROM and a CD-ROM, and a hard disk and the like embedded in a computer system. Further, the "computer-readable recording medium" also includes a medium for dynamically holding a program for a short time, such as a communication line in a case where the program is transmitted through a network such as the Internet or a communication line such as a telephone line, and a medium for holding the program for a fixed time, such as a volatile memory in a computer system which is a server or a client in such a case. Moreover, the program may realize part of the aforementioned functions or combine the aforementioned functions with programs that have been recorded on a computer system to realize the functions.

Although embodiments of the present invention have been described in detail with reference to the attached drawings, specific configurations are not limited to the embodiments and may include design modification and the like without departing from the spirit or scope of the invention.

INDUSTRIAL APPLICABILITY

The present invention relates to an electric power generation control device including an event detection unit which, when an electric power converter, connecting a generator to a DC power transmission unit which transmits DC power, has detected a failure necessitating interruption of electric power transmission from the generator by the DC power transmission unit, detects an event attributable to a deterioration in the balance between a torque input to the generator and an effective power output by the generator, the deterioration being caused by a reduction in a set value of the effective power received from the generator by the electric power converter, and a torque command reduction unit which, when the event detection unit has detected an event attributable to a deterioration in the balance, causes a reduction in a torque command to a motor which outputs the torque input to the generator.

According to the present invention, electric power generation equipment can detect an incident at an electric power system side rather than an electric power converter that connects a DC power transmission unit to the electric power system even in a case where a short-circuit current is high in the electric power generation equipment.

REFERENCE SIGNS LIST 1, 2, 3 Electric power generation and transmission system
10, 410 Wind turbine
11 Blade
12 Hydraulic pump
13 Accumulator
14 Hydraulic motor
15 Synchronous generator
16, 30, 80 Transformer
20 AC bus
41 Electric power converter of wind turbine side
42 Converter control device of wind turbine side
421 Voltage control unit
422 Command output unit at cutoff time
423 First event detection unit
424 Command-switching unit
50 DC power transmission unit
61 Semiconductor switch
62 Damping resistor
71 Electric power converter of system side
72 Converter control device of system side
100 Electric power generation control device
110 Blade pitch control unit
120 Pump control unit
130 Motor control unit
131 Torque control unit
132 Command output unit at cutoff time
133 Second event detection unit
134 Command-switching unit
140 Generator control unit
411 Permanent magnet sync
412 AC/DC converter
413 DC bus
414 DC/AC converter
90 Elect power system

The invention claimed is:

1. A control device for controlling a hydraulic motor driven by a turbine, the control device comprising:
at least one memory; and
at least one processor configured to:
determine occurrence of an increase in a frequency of an offshore electric power system; and
cause a reduction in a torque command to the hydraulic motor upon the increase in the frequency of the offshore electric power system,
wherein:
the reduction in the torque command to the hydraulic motor causes a reduction in a torque output by the hydraulic motor;
the hydraulic motor is configured to output the torque to a generator such that the generator outputs an electric power to a direct current (DC) power transmission unit through an electric power converter;
the offshore electric power system includes the generator and the turbine-driven hydraulic motor; and
the increase in the frequency is caused by a reduction of an effective power of the electric power received from the generator by the electric power converter.

2. The control device according to claim 1, wherein the reduction of the effective power of the electric power received from the generator is caused by the electric power converter being interrupted.

3. The control device according to claim 1, wherein the reduction of the effective power occurs when an incident at a point of interconnection between the offshore electric power system and an electric power distribution system is detected.

4. A control method for controlling a hydraulic motor driven by a turbine, the control method comprising:
determining occurrence of an increase in a frequency of an offshore electric power system; and
causing a reduction in a torque command to the hydraulic motor upon the increase in the frequency of the offshore electric power system,
wherein:
the reduction in the torque command to the hydraulic motor causes a reduction in a torque output by the hydraulic motor;
the hydraulic motor is configured to output the torque to a generator such that the generator outputs an electric power to a direct current (DC) power transmission unit through an electric power converter;
the offshore electric power system includes the generator and the turbine-driven hydraulic motor; and
the increase in the frequency is caused by a reduction of an effective power of the electric power received from the generator by the electric power converter.

5. The control method according to claim 4, wherein the reduction of the effective power occurs when an incident at a point of interconnection between the offshore electric power system and an electric power distribution system is detected.

* * * * *